(12) United States Patent
Tanaka et al.

(10) Patent No.: US 7,092,683 B2
(45) Date of Patent: Aug. 15, 2006

(54) TRANSMISSION CIRCUIT

(75) Inventors: Koichiro Tanaka, Hyogo (JP); Mitsuru Tanabe, Osaka (JP); Noriaki Saito, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 354 days.

(21) Appl. No.: 10/811,827

(22) Filed: Mar. 30, 2004

(65) Prior Publication Data

US 2004/0198258 A1    Oct. 7, 2004

(30) Foreign Application Priority Data

Apr. 1, 2003  (JP) .............................. 2003-097889

(51) Int. Cl.
H04B 1/02    (2006.01)
H04B 1/04    (2006.01)

(52) U.S. Cl. .................. 455/108; 455/110; 455/127.2; 455/574; 375/298; 375/300; 375/302

(58) Field of Classification Search ................ 455/91, 455/95, 102, 108, 110, 114.2, 115.1, 127.1, 455/127.2, 127.5, 522, 572, 574; 375/295, 375/296, 297, 298, 300, 302; 330/127, 135, 330/199; 332/144, 145, 149, 150, 155
See application file for complete search history.

(56) References Cited

U.S. PATENT DOCUMENTS 3,662,290 A * 5/1972 Elliott ........................ 455/108
4,592,073 A * 5/1986 Watanabe .................. 375/297
5,093,637 A * 3/1992 Isota et al. ................. 375/297
5,193,223 A * 3/1993 Walczak et al. .......... 455/115.1
6,256,482 B1   7/2001 Raab
7,010,280 B1 * 3/2006 Wilson .................... 455/114.2

FOREIGN PATENT DOCUMENTS

JP          3-34709         2/1991
JP      P2001-320246 A    11/2001

\* cited by examiner

*Primary Examiner*—Quochien B. Vuong
(74) *Attorney, Agent, or Firm*—McDermott Will & Emery LLP

(57) ABSTRACT

A transmission circuit includes: a modulated signal generator for outputting a modulated signal; an envelope detector for outputting an amplitude modulated voltage; an amplitude roll-off LPF for attenuating the amplitude modulated voltage by using a damping property represented by an exponential function in which an argument is exponentially proportional to a frequency; a power-supply-voltage generator for generating a power supply voltage in accordance with an amplitude value of the amplitude modulated voltage; a phase detector for outputting a phase modulated signal; a phase roll-off LPF for attenuating the phase modulated signal by using a damping property represented by an exponential function in which an argument is exponentially proportional to an offset frequency with respect to a center frequency; and an RF power amplifier.

16 Claims, 14 Drawing Sheets

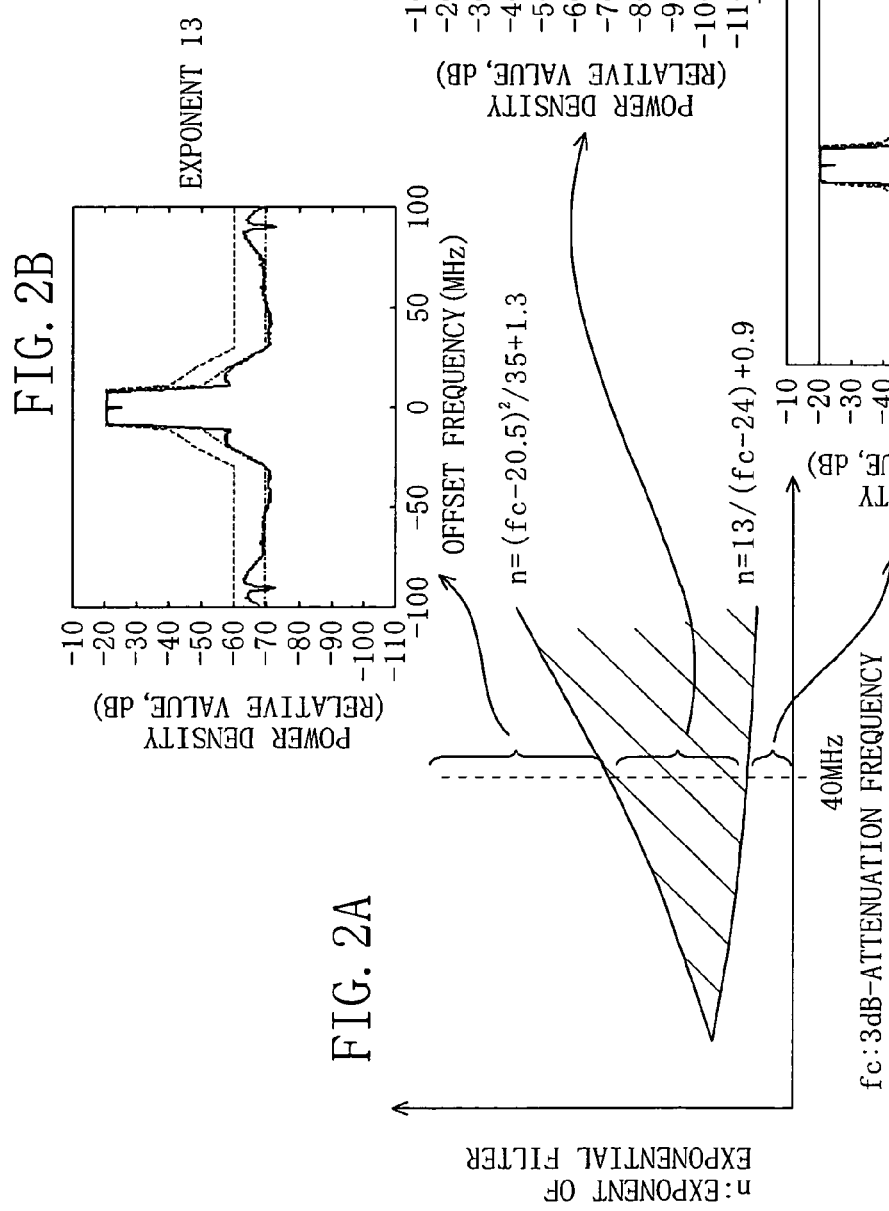

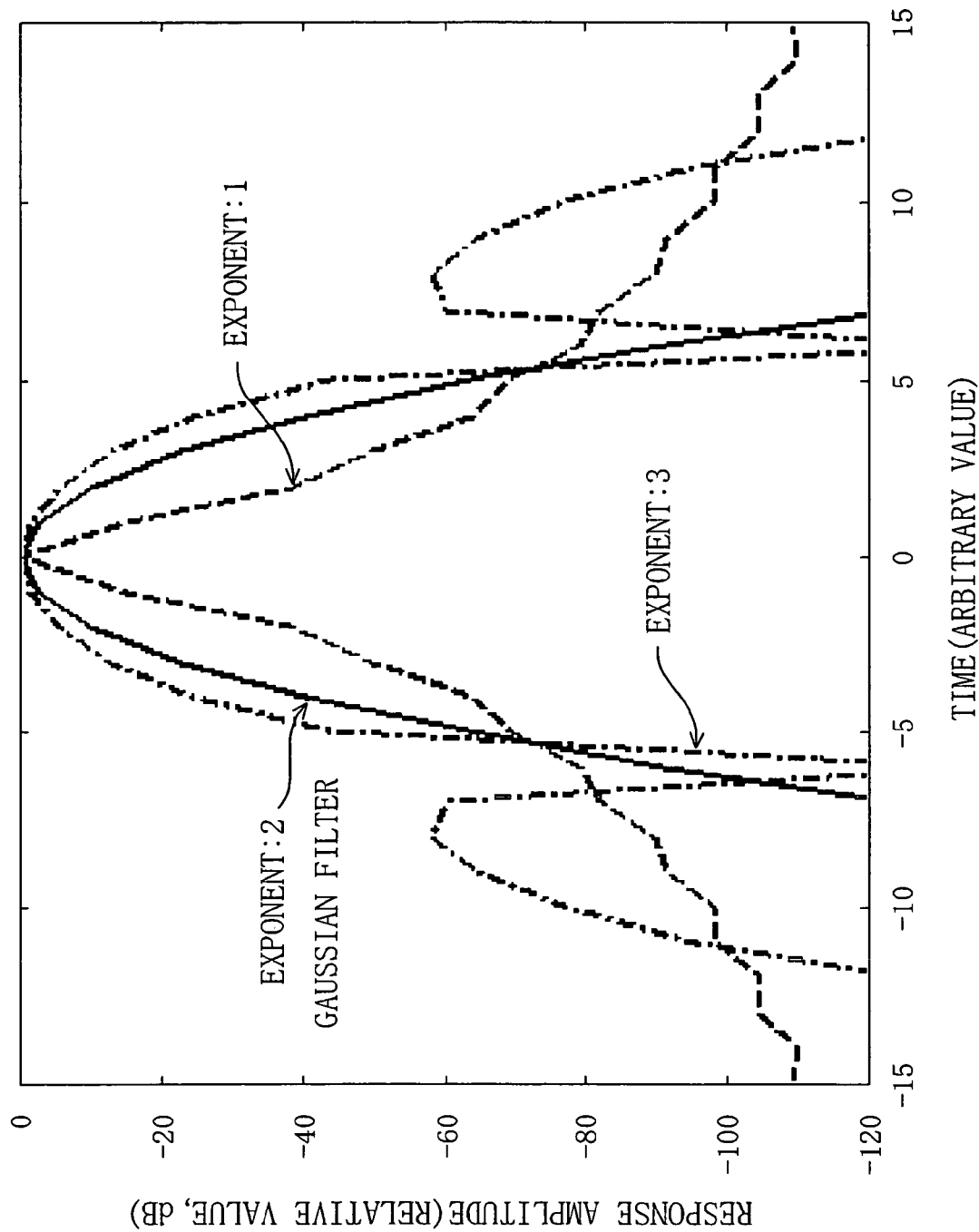

ACTIVE FILTER    CUTOFF FREQUENCY : 40MHz

| R1 (Ω) | R2 (Ω) | R3 (Ω) | C1 (pF) | C2 (pF) | C3 (pF) | C4 (pF) | C5 (pF) |
|---|---|---|---|---|---|---|---|
| 220 | 220 | 220 | 18 | 12 | 6 | 10 | 12 |

LC FILTER(1)    CUTOFF FREQUENCY : 40MHz

| C1 | L2 | C2 | L3 |
|---|---|---|---|
| 68pF | 470nH | 56pF | 82nH |

| L1 |
|---|
| 56nH |

LC FILTER(2)    CUTOFF FREQUENCY : 40MHz

| C1 | L1 | C2 | L2 | C3 |
|---|---|---|---|---|
| 22pF | 180nH | 180pF | 150nH | 33pF |

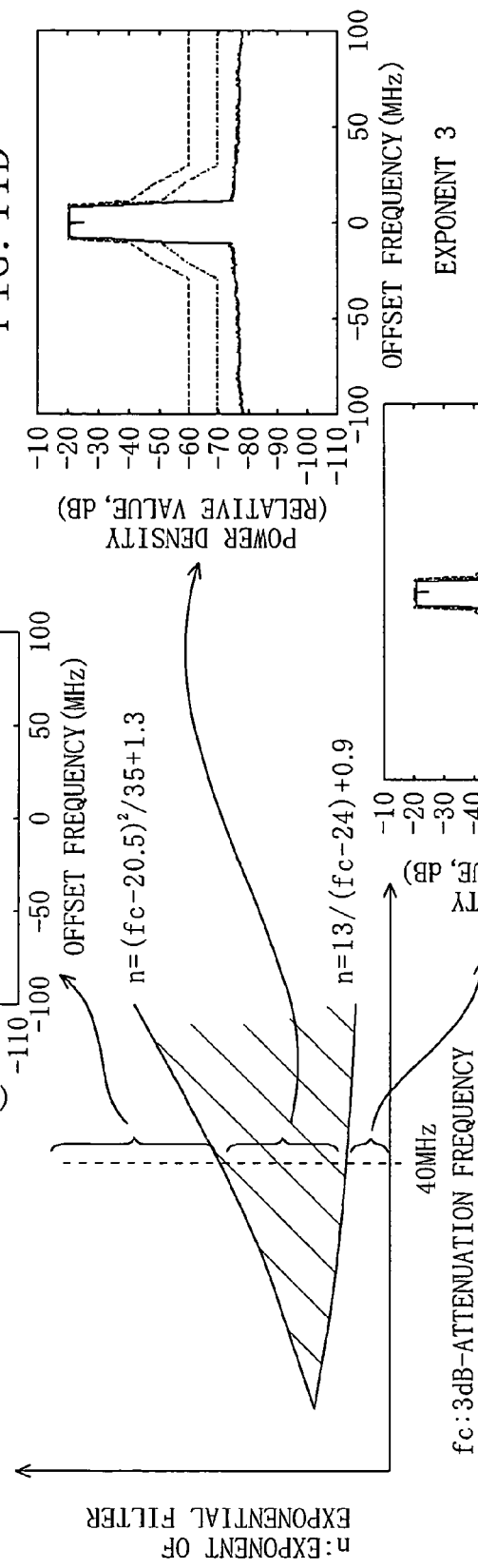

TRANSMISSION CIRCUIT

BACKGROUND OF THE INVENTION

The present invention relates to circuits for transmitters of radio communications, below denoted as "transmission circuits".

In general, to process modulated signals with amplitude modulation, especially multiple modulation such as Quadrature Amplitude Modulation (QAM), radio-frequency power amplifiers in transmission circuits for transmitting power to antennas need linear amplification. Therefore, class A or AB had been adopted as operation classes of the RF power amplifiers.

However, with the progress of broadband communication, communication methods using subcarrier modulation such as Orthogonal Frequency Division Multiplex (OFDM) have come to be used and high efficiency is not expected any more with the conventional class-A or AB radio frequency amplifiers. That is, in the OFDM modulation, subcarriers are overlapped so that a large amount of power is instantaneously generated at random time and the ratio between the average power and the peak power, i.e., a Peak to Average Power Ratio (PAPR), is high. Therefore, a large amount of DC power always needs to be held in order to allow linear amplification of peak power which is much greater than the average power. With respect to class-A operation, the efficiency is only 50% at the maximum. In particular, in the case of the OFDM modulation, since the PAPR is high, DC power obtained by multiplying current by the difference between the peak voltage for the peak power and the instantaneous voltage for the instantaneous power is lost in the form of heat in almost all the time except for the period in which the peak power is output. Accordingly, the resultant efficiency decreases largely.

As a result, portable wireless equipments using batteries as their power supplies, for example, have shorter continuous operation time, and thus inconveniences arise in actual application.

To solve this problem, a conventional Envelope Elimination and Restoration (EER) technique known as Kahn Technique was disclosed in FIG. 6 of U.S. Pat. No. 6,256,482B1, for example.

In the configuration disclosed in the above patent (see FIG. 6), an input RF modulated signal is detected and divided into two components. One of the components is an amplitude component corresponding to the envelope of the modulated signal. This amplitude component is subjected to an amplitude modulation by an amplitude modulator constituted by, for example, a switching regulator, and is supplied to a power-supply-voltage terminal of an RF power amplifier. The other component is controlled by an amplitude control amplifier (limiter) to have a constant amplitude, and serves a phase modulated signal (phase component) whose phase only is modulated. This phase component is supplied to an RF input terminal of the RF power amplifier.

According to the EER technique, a switching amplifier with high efficiency can be used as the RF power amplifier so that a minimum power supply voltage necessary for power amplification is supplied to the power-supply-voltage terminal of the RF power amplifier, thereby enhancing the efficiency.

As disclosed in Japanese Laid-Open Publication No. 3-34709 (see FIG. 1), for example, another EER technique is proposed. This EER technique is suitable for digital signal processing and obtains a phase modulated signal by a quadrature modulation of a complex envelope signal. In the configuration disclosed in this publication, a modulated signal with a remaining modulated amplitude is supplied as a phase modulated signal to an RF power amplifier.

FIG. 13 is a block circuit diagram schematically showing a conventional transmission circuit using an EER technique. This transmission circuit includes: a modulated signal generator 101 for outputting a modulated signal to two branched lines; an envelope detector 102 for receiving one of the branched modulated signals, detecting the envelope of the received signal and outputting an amplitude component thereof; a power-supply-voltage generator 103 (a DC-to-DC converter) for receiving the amplitude component from the envelope detector 102 and generating a power supply voltage in accordance with the amplitude value; a phase detector 104 (an amplitude control amplifier) for receiving the other one of the branched modulated signals and outputting a phase modulated signal as a phase component; a quadrature modulator 105 for receiving the phase modulated signal from the phase detector 104 and performing a quadrature modulation thereon; and an RF power amplifier 106 for receiving the output from the power-supply-voltage generator 103 at its power-supply-voltage terminal and receiving the output from the quadrature modulator 105 at its RF input terminal.

The modulated signal generator 101 performs a modulation such as QAM or OFDM modulation based on data generated inside the circuit or supplied from the outside and outputs a modulated signal for transmission represented by a complex envelope. The envelope detector 102 obtains the absolute value of the complex envelope representing the modulated signal and outputs an amplitude component. The power-supply-voltage generator 103 performs DC-to-DC conversion, thereby generating a power supply voltage in accordance with the amplitude component. The phase detector 104 keeps the absolute value of the complex envelope at a constant value while maintaining the phase of the complex envelope representing the modulated signal, and outputs a phase component represented by the complex envelope. The quadrature modulator 105 performs a quadrature modulation on the phase component represented by the complex envelope and converts the component into an RF signal, thereby generating a phase modulated signal. The RF power amplifier 106 amplifies the phase modulated signal (phase component) to obtain an RF signal with an amplitude according to the amplitude modulated voltage (amplitude component), thereby outputting a modulated signal whose amplitude and phase are variable.

SUMMARY OF THE INVENTION

However, the conventional transmission circuits have the following drawbacks. In a conventional transmission circuit, an envelope detector or a phase detector performs nonlinear signal processing, so that the bandwidths of the amplitude modulated voltage and the phase modulated signal are very wide. On the other hand, because of removal of a frequency aliasing component output by a sampling system of digital signal processing or frequency characteristics of analog circuits, the bandwidths of the amplitude modulated voltage and the phase modulated signal are limited. In general, as a frequency band where these bandwidths are limited becomes wider, the spectrum of a modulated signal less deteriorates. However, in the conventional transmission circuit, even if the frequency band where the bandwidths are limited is considerably wide, the spectrum of the modulated signal still deteriorates greatly. In addition, power consumption increases as the sampling frequency in digital signal processing increases and frequency characteristics in designing the analog circuits are limited, so that it is impossible to unlimitedly widen the frequency band where the bandwidths are limited.

In the spectrum of the modulated signal output from the conventional transmission circuit adopting, for example, an OFDM modulation based on IEEE 802.11a standard, the occupied bandwidth (fop) of the modulated signal is 16.6 MHz. FIG. 14 is a graph showing an example of the spectrum of the modulated signal output from the conventional transmission circuit. FIG. 14 shows a simulated value of the modulated signal spectrum in a case where the bandwidth of the amplitude modulated voltage is 90 MHz, the bandwidth of the phase modulated signal is ±90 MHz with respect to the center frequency, and both bandwidths are limited to values which are considerably larger than those of the original complex envelope. In FIG. 14, the abscissa represents an offset frequency with respect to the center frequency of the modulated signal after frequency conversion and the ordinate represents the power density of the modulated signal. In FIG. 14, the solid line indicates a power density of the modulated signal, the broken line indicates the upper limit of a power density defined based on IEEE 802.11a standard, and the dash-dotted line indicates a power density with a margin of 10 dB from the upper limit of the power density defined based on IEEE 802.11a standard. The power density remains even at difference frequencies at large distances from the center frequency of the modulated signal and rises near the difference frequencies of ±90 MHz, so that the margin from the upper limit of the power density is smaller than 10 dB.

It is therefore an object of the present invention to provide a transmission circuit capable of outputting a modulated signal whose spectrum hardly deteriorates without extremely widening the frequency band where the bandwidths of an amplitude modulated voltage and a phase modulated signal are limited.

Specifically, in a first transmission circuit according to the present invention, at least an amplitude modulated voltage is generated in accordance with a modulated signal including an amplitude and a phase, and the phase modulated voltage is subjected to amplitude bandwidth limitation that attenuates the amplitude modulated voltage by using a damping property represented by an exponential function in which an argument is exponentially proportional to a frequency.

Then, unnecessary power density in the band around the center frequency of the modulated signal is suppressed, so that it is possible to suppress deterioration of spectrum of the modulated signal to be transmitted while not extremely widening the frequency band where the bandwidth of the amplitude modulated voltage is limited. Accordingly, a transmission circuit in an appropriate scale is implemented without extremely enhancing the operation speed of the circuit and the required frequency characteristics.

If the argument of the exponential function in this bandwidth limitation is set within an appropriate range, optimum exponent n is selected depending on the band where the transmission circuit operates, so that unnecessary power density at frequencies around the center frequency of the modulated signal is suppressed.

In particular, if exponent n is selected such that bandwidth limitation using a Gaussian filter is performed, the time response during the bandwidth limitation converges within a short period.

The first inventive transmission circuit may include: means for performing voltage conversion on the amplitude modulated voltage subjected to the amplitude bandwidth limitation and generating a power supply voltage; an RF power amplifier including an RF input terminal and a power-supply-voltage terminal; and frequency converting means provided at an earlier stage of the RF power amplifier.

The first inventive transmission circuit may further include means for generating a phase modulated signal in accordance with the modulated signal including the amplitude and the phase, and performing phase bandwidth limitation that attenuates a voltage by using a damping property represented by an exponential function in which an argument is exponentially proportional to an offset frequency with respect to the center frequency.

If the argument of the exponential function in this bandwidth limitation is set within an appropriate range, optimum exponent m is selected depending on the band where the transmission circuit operates, so that unnecessary power densities at frequencies at large distances from the center frequency of the modulated signal are suppressed.

In particular, if exponent m is selected such that bandwidth limitation using a Gaussian filter is performed, the time response during the bandwidth limitation process converges within a short period.

In a second transmission circuit according to the present invention, an amplitude modulated voltage and a phase modulated signal are generated in accordance with a modulated signal including an amplitude and a phase, and the phase modulated signal is subjected to phase bandwidth limitation that attenuates the phase modulated signal by using a damping property represented by an exponential function in which an argument is exponentially proportional to a frequency.

Then, unnecessary power densities at frequencies at large distances from the center frequency of the modulated signal are suppressed, so that it is possible to suppress deterioration of the spectrum of the modulated signal to be transmitted while not extremely widening the frequency band where the bandwidth of the phase modulated signal is limited. Accordingly, a transmission circuit in an appropriate scale is implemented without extremely enhancing the operation speed of the circuit and the required frequency characteristics.

The inventive transmission circuit is capable of suppressing deterioration of spectrum of a modulated signal to be transmitted without extremely widening the frequency band where the bandwidths of an amplitude modulated voltage and a phase modulated signal are limited. Accordingly, the inventive transmission circuit is implemented in an appropriate scale without extremely enhancing the operation speed of the circuit and required frequency characteristics.

BRIEF DESCRIPTION OF THE DRAWINGS

FIGS. 2A through 2D are graphs showing simulation results of a modulated signal spectrum with respect to an appropriate area of exponent n of an exponential filter according to a first specific example of the first embodiment and to respective values of exponent n.

FIG. 6 is a graph showing impulse response characteristics of a roll-off filter in cases where the exponent is one, two and three, respectively.

FIGS. 11A through 11D are graphs showing an appropriate area of exponent n of an exponential filter according to a first specific example of the second embodiment, and simulation results of a modulated signal spectrum with respect to respective values of exponent n.

DESCRIPTION OF THE PREFERRED EMBODIMENTS

Embodiment 1

Figure 1:
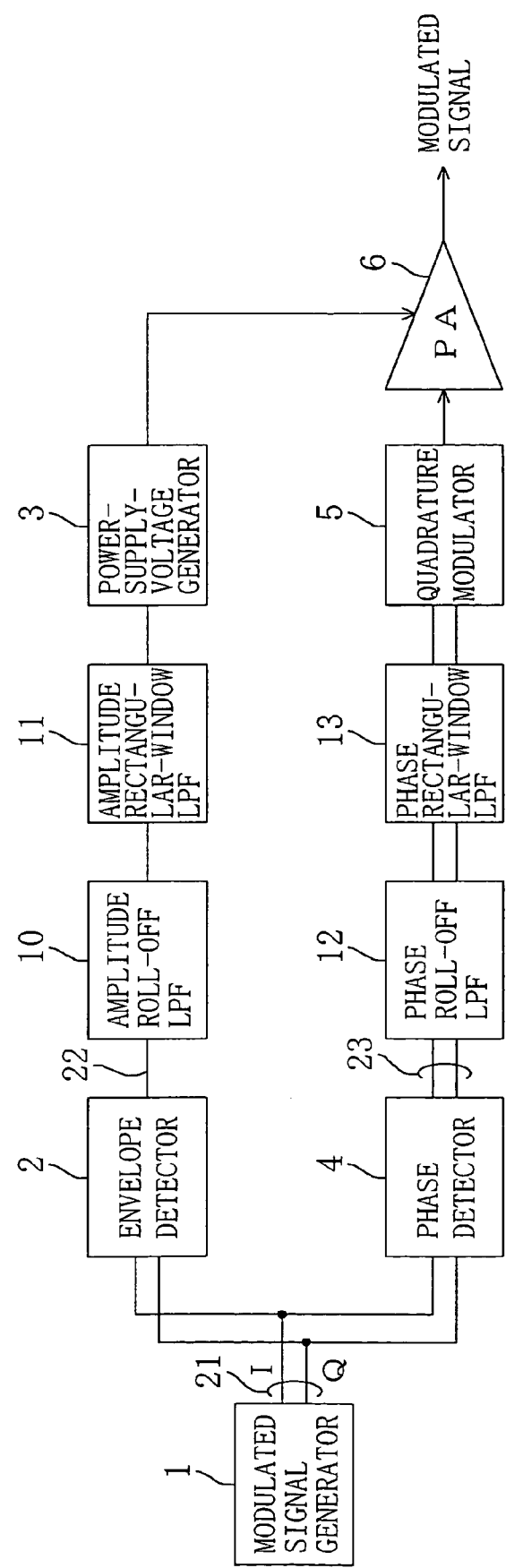
FIG. 1 is a block circuit diagram showing a transmission circuit according to a first embodiment of the present invention.

FIG. 1 is a block circuit diagram showing a transmission circuit according to a first embodiment of the present invention. As shown in FIG. 1, the transmission circuit of this embodiment includes: a modulated signal generator 1 for outputting a modulated signal; modulated signal lines 21 each divided into two branches and used for transmitting a modulated signal; an envelope detector 2 connected to the branches at one side of the respective modulated signal lines 21, receiving the modulated signal to detect the envelope of the signal and outputting an amplitude modulated voltage (an amplitude component); an amplitude modulated voltage line 22 extending from the envelope detector 2; an amplitude roll-off low-pass filter (LPF) 10 interposed in the amplitude modulated voltage line 22, receiving the amplitude modulated voltage output from the envelope detector 2 and performing bandwidth limitation on the received voltage; an amplitude rectangular-window LPF 11 interposed in the amplitude modulated voltage line 22, receiving the amplitude modulated voltage which has passed through the amplitude roll-off LPF 10 and performing bandwidth limitation on the received voltage; a power-supply-voltage generator 3 (a DC-to-DC converter) interposed in the amplitude modulated voltage line 22, receiving the amplitude modulated voltage which has passed through the amplitude rectangular-window LPF 11 and generating a power supply voltage in accordance with an amplitude value; a phase detector 4 (an amplitude control amplifier) connected to the branches at the other side of the respective modulated signal lines 21, receiving the modulated signal and outputting a phase modulated signal (a phase component); phase modulated signal lines 23 extending from the phase detector 4; a phase roll-off LPF 12 interposed in the phase modulated signal lines 23, receiving the phase modulated signal output from the phase detector 4 and performing bandwidth limitation on the received signal; a phase rectangular-window LPF 13 interposed in the phase modulated signal lines 23, receiving the phase modulated signal output from the phase roll-off LPF 12 and performing bandwidth limitation on the received signal; a quadrature modulator 5 interposed in the phase modulated signal lines 23, receiving the phase modulated signal output from the phase rectangular-window LPF 13 and performing a quadrature modulation on the received signal; and an RF power amplifier 6 receiving the output from the power-supply-voltage generator 3 at its power-supply-voltage terminal and receiving the output from the quadrature modulator 5 at its RF input terminal.

In this embodiment, the envelope detector 2 constitutes an amplitude modulated voltage generating means, the phase detector 3 constitutes a phase modulated signal generating means, the amplitude roll-off LPF 10 and the amplitude rectangular-window LPF 11 constitute an amplitude bandwidth limiting means, and the phase roll-off LPF 12 and the phase rectangular-window LPF 13 constitute a phase bandwidth limiting means. It should be noted that the amplitude rectangular-window LPF 11 and the phase rectangular-window LPF 13 are not necessarily provided. If analog circuits at respective portions have appropriate frequency cutoff characteristics, these filters are unnecessary. These components are shown in FIG. 1 only to indicate positions at which cutoff frequencies are set in examples of spectrum of the modulated signal later.

Now, it will be described how the transmission circuit shown in FIG. 1 operates.

The modulated signal generator 1 performs a modulation such as QAM or OFDM modulation based on data generated inside the circuit or data supplied from the outside and outputs a modulated signal for transmission represented by a complex envelope. The envelope detector 2 outputs an amplitude modulated voltage by obtaining the absolute value of the complex envelope representing the modulated signal.

The amplitude roll-off LPF 10 performs, on the amplitude modulated voltage, low-pass filtering with a roll-off characteristic that the attenuation rate of the voltage increases monotonously as the frequency increases. The low-pass filtering with the roll-off characteristic for monotonously increasing attenuation rate is low-pass filtering that attenuates the amplitude modulated voltage by using a damping property represented by an exponential function in which an argument is exponentially proportional to the frequency, as will be specifically described later.

The amplitude rectangular-window LPF 11 performs, on the amplitude modulated voltage, low-pass filtering with a rectangular window for further cutting off frequencies higher than a given frequency. The power-supply-voltage generator 3 generates an amplitude modulated voltage in accordance with the amplitude modulated voltage subjected to the filtering.

The power-supply-voltage generator 3 is constituted by a DC-to-DC converter and performs linear operation in general, so that the low-pass filtering performed on the amplitude modulated voltage as an input provides effects similar to those obtained by performing low-pass filtering on an amplitude modulated voltage as an output.

The phase detector 4 keeps the absolute value of the complex envelope at a constant value while maintaining the phase of the complex envelope representing the modulated signal, and outputs a phase modulated signal represented by the complex envelope.

The phase roll-off LPF 12 performs, on the phase modulated signal represented by the complex envelope, low-pass filtering with a roll-off characteristic that the attenuation rate of the voltage increases monotonously as the frequency increases. The low-pass filtering with a roll-off characteristic for monotonously increasing attenuation rate of the voltage is low-pass filtering that attenuates the voltage with a damping property represented by an exponential function in which an argument is exponentially proportional to a frequency, as will be specifically described later.

The phase rectangular-window LPF 13 performs, on the phase modulated signal represented by the complex envelope, low-pass filtering with a rectangular window for cutting off frequencies higher than a given frequency.

The quadrature modulator 5 performs a quadrature modulation on the phase modulated signal subjected to the filtering and represented by the complex envelope and converts the phase modulated signal into an RF signal, thereby generating a phase modulated signal. Since the quadrature modulator 5 converts the frequency of the complex envelope, the low-pass filtering performed on the complex envelope as an input provides effects similar to those obtained by performing bandpass filtering on a phase modulated signal as an output.

The RF power amplifier 6 amplifies the phase modulated signal subjected to the bandpass filtering to obtain an RF signal with an amplitude according to the amplitude modulated voltage subjected to the low-pass filtering, thereby outputting a modulated signal whose amplitude and phase are variable.

Each of the amplitude roll-off LPF 10, the amplitude rectangular-window LPF 11 and the power-supply-voltage generator 3 performs linear operation, so that the order of arrangement of these components with respect to the flow of the signal may differ from that described in this embodiment.

The phase roll-off LPF 12, the phase rectangular-window LPF 13 and the quadrature modulator 5 also perform linear operation, so that the order of arrangement of these components with respect to the flow of the signal may differ from that described in this embodiment. In a case where a component corresponding to an LPF (low-pass filter) is placed at a subsequent stage of the quadrature modulator 5, a bandpass filter is provided as this filter.

In this embodiment, either the amplitude roll-off LPF 10 (and the amplitude rectangular-window LPF 11) as an amplitude bandwidth limiting means or the phase roll-off LPF 12 (and the phase rectangular-window LPF 13) as a phase bandwidth limiting means is not necessarily provided. Even if one of these filters is not provided, basic advantages of this embodiment are obtained. This will be described in the following specific examples.

In the following specific examples, exemplary characteristics of a roll-off LPF and a roll-off bandpass filter for the transmission circuit of this embodiment will be described, and examples of spectrum of a modulated signal to be output will be also described. As an example, an OFDM modulation based on IEEE 802.11a standard is used. For reference, the occupied bandwidth (fop) of the modulated signal generated by the modulated signal generator 1 is 16.6 MHz.

FIRST SPECIFIC EXAMPLE

First, a first specific example in which only the amplitude bandwidth limiting means out of the amplitude bandwidth limiting means and the phase bandwidth limiting means is used will be described. That is, in this specific example, the phase roll-off LPF 12 and the phase rectangular-window LPF 13 are not provided. As the amplitude roll-off LPF 10 serving as the amplitude bandwidth limiting means, an exponential filter having the following function is used. The exponential filter has a filtering characteristic that the amplitude ratio of a voltage after passage to an input voltage is proportional to the value obtained by the following expression:

$$\exp\{-(\ln 2)/2(f/fc)^n\}$$

where $13/\{(16.6fc/fop)-24\}+0.9 \leq n \leq \{(16.6fc/fop)-20.5\}^2/35+1.3$, f is the f (MHz), fc is the 3 dB-attenuation frequency (MHz), and fop is the occupied bandwidth (MHz) of a modulated signal.

FIG. 2A through 2D are graphs for showing an appropriate area of exponent n of the exponential filter according to the first specific example and simulation results of the modulated signal spectrum (relative value of the power density) with respect to respective values of exponent n.

FIG. 2A shows the appropriate area of exponent n (ordinate) of the exponential filter with respect to 3 dB-attenuation frequency fc (abscissa). The appropriate area of exponent n is represented as the hatched area in FIG. 2A. Specifically, the lower limit of the appropriate area of exponent n is defined by the curve $n=13/\{(16.6fc/fop)-24\}+0.9$, and the upper limit thereof is defined by the curve $n=\{(16.6fc/fop)-20.5\}^2/35+1.3$. It should be noted that in FIG. 2A, the occupied bandwidth fop of the modulated signal is 16.6 MHz, the cutoff frequency of the amplitude rectangular-window LPF is 70 MHz, and the bandwidth limitation performed on the phase modulated signal is 90 MHz as in the conventional example.

FIGS. 2B through 2D show respective simulation results for the modulated signal spectrum. The abscissa represents the offset frequency with respect to the center frequency and the ordinate represents the power density. In FIGS. 2B through 2D, the solid lines indicate a power density of the modulated signal, the broken lines indicate the upper limit of a power density defined based on IEEE 802.11a standard, and the dash-dotted lines indicate a power density with a margin of 10 dB from the upper limit of the power density defined based on IEEE 802.11a standard. In the examples shown in FIGS. 2B through 2D, 3 dB-attenuation frequency fc is 40 MHz.

Figure 14:
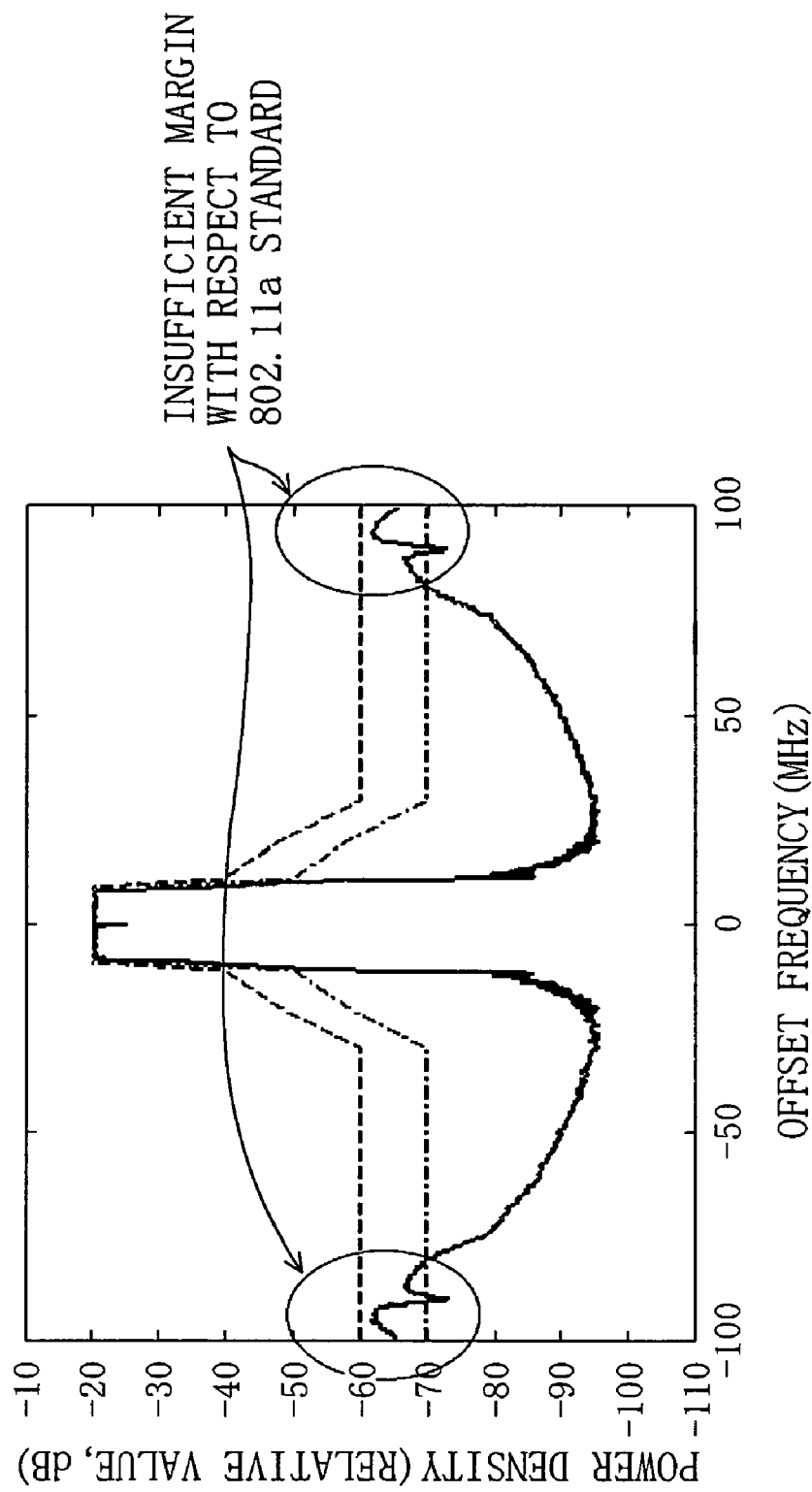
FIG. 14 is a graph showing an example of the spectrum of a modulated signal output from the conventional transmission circuit.

It was found that even with the exponential filter, the modulated signal spectrum around the center frequency can deteriorate though the margin based on IEEE 802.11a standard is improved as compared to the conventional transmission circuit shown in FIG. 14. Therefore, exponent n in a case where a margin of 10 dB from the upper limit of the power density based on IEEE 802.11a standard is provided was examined. As a result, it was found that exponent n has an appropriate area, which varies depending on 3 dB-attenuation frequency fc.

Specifically, as shown in FIG. 2B, if exponent n deviates from the appropriate area toward larger values (e.g., n=13), the power density rises around difference frequencies (±70

MHz) with respect to the cutoff frequency of the amplitude rectangular-window filter, so that the margin of 10 dB disappears. If exponent n deviates from the appropriate area toward smaller values (e.g., n=1) as shown in FIG. 2C, the margin of 10 dB disappears around the center frequency. If exponent n is within the appropriate area (e.g., n=3) as shown in FIG. 2D, the power density has the margin of 10 dB around the center frequency as intended.

SECOND SPECIFIC EXAMPLE

Next, a second specific example in which only the phase bandwidth limiting means-out of the amplitude bandwidth limiting means and the phase bandwidth limiting means is used will be described. That is, in this specific example, the amplitude roll-off LPF 10 and the amplitude rectangular-window LPF 11 are not provided. As the phase roll-off LPF included in the phase bandwidth limiting means, an exponential filter having the following function is used. The exponential filter has a filtering characteristic that the amplitude ratio of a voltage after passage to an input voltage is proportional to the value obtained by the following expression:

$$\exp\{-(1n2)/2(f/fc)^m\}$$

where $0 \leq m \leq 3.5 \exp[0.0615\{(16.6 \text{ fc/fop})-30\}]$, fc is the 3 dB-attenuation frequency (MHz), fop is the occupied bandwidth of the modulated signal (MHz), f is the frequency (MHz), and fc is the 3 dB-attenuation offset frequency (MHz).

Figure 3C:
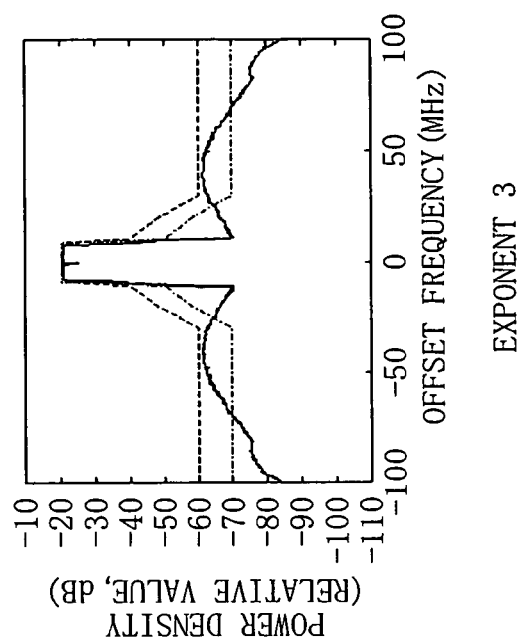
FIGS. 3A through 3C are graphs showing simulation results of a modulated signal spectrum with respect to an appropriate area of exponent n of an exponential filter according to a second specific example of the first embodiment and to respective values of exponent n.
Figure 3B:
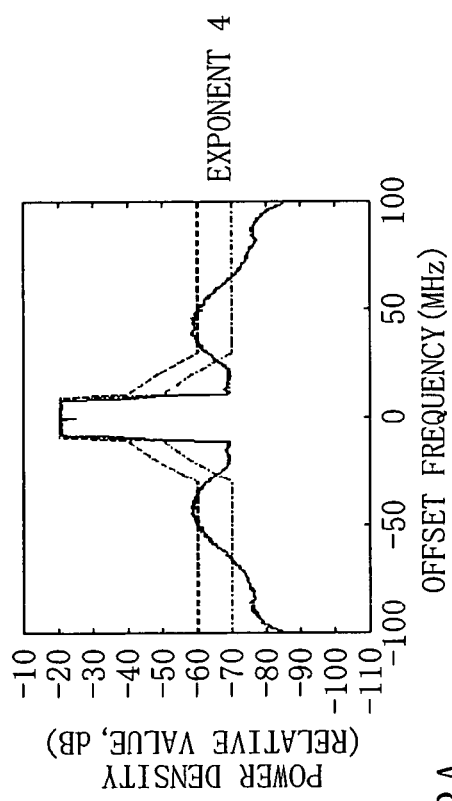
Figure 3A:
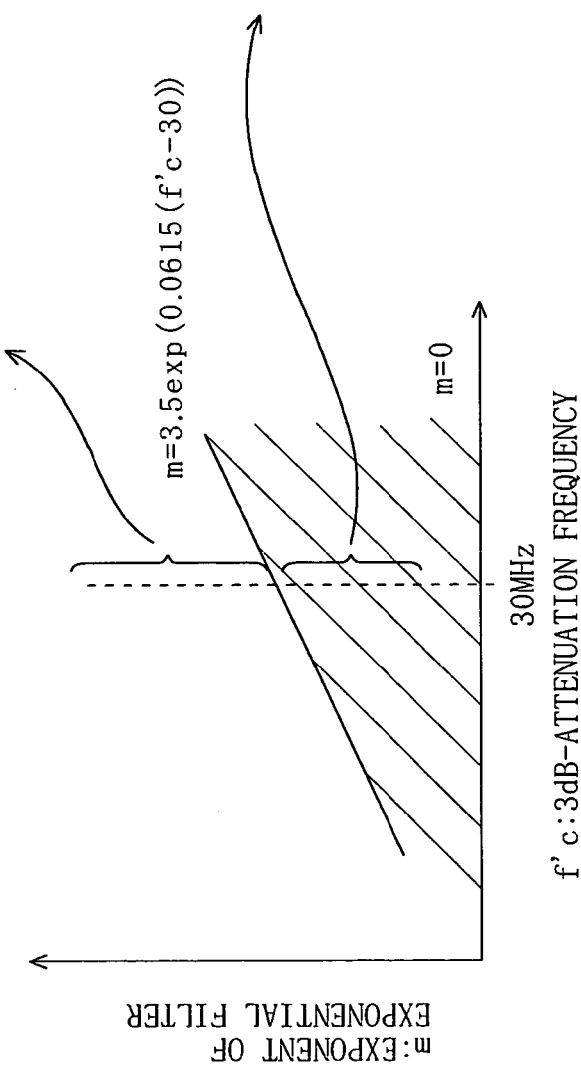

FIG. 3A through 3C are graphs for showing an appropriate area of exponent n of the exponential filter according to the second specific example and simulation results of the modulated signal spectrum (relative value of the power density) with respect to respective values of exponent m.

FIG. 3A shows the appropriate area of exponent m (ordinate) of the exponential filter with respect to 3 dB-attenuation frequency fc (abscissa). The appropriate area of exponent m is represented as the hatched area in FIG. 3A. Specifically, the lower limit of the appropriate area of exponent n is defined by the abscissa m=0, and the upper limit thereof is defined by the curve m=3.5 exp[{0.0615 (16.6 fc/fop)−30}]. It should be noted that in FIG. 3A, the occupied bandwidth fop of the modulated signal is 16.6 MHz, the cutoff frequency of the amplitude rectangular-window LPF is 80 MHz and the bandwidth limitation of the phase modulated signal is 90 MHz as in the conventional example.

FIGS. 3B and 3C show respective simulation results of the modulated signal spectrum. The abscissa represents the offset frequency with respect to the center frequency and the ordinate represents the power density. In FIGS. 3B and 3C, the solid lines indicate a power density of the modulated signal, the broken lines indicate the upper limit of a power density defined based on IEEE 802.11a standard, and the dash-dotted lines indicate a power density with a margin of 10 dB from the upper limit of the power density defined based on IEEE 802.11a standard. In the examples shown in FIGS. 3B and 3C, 3 dB-attenuation frequency fc is 30 MHz.

It was found that even with the exponential filter, the modulated signal spectrum around the center frequency can deteriorate though the rising of the modulated signal spectrum around difference frequencies of ±90 MHz where the 10 dB margin based on IEEE 802.11a standard is not allowed in the conventional transmission circuit shown in FIG. 14 is suppressed and a margin of 10 dB or more is provided. Therefore, exponent m in a case where the margin of 10 dB from the upper limit of the power density based on IEEE 802.11a standard is provided was also examined with respect to the phase modulated signal. As a result, it was found that exponent m has an appropriate area, which varies depending on 3 dB-attenuation frequency fc.

Specifically, as shown in FIG. 3B, if exponent m deviates from the appropriate area toward larger values (e.g., m=4), the power density rises around difference frequencies of Δc (=30 MHz) to exceed its upper limit. On the other hand, if exponent m is within the appropriate area (e.g., m=3) as shown in FIG. 3C, the power density is within the area defined by the standard as intended.

THIRD SPECIFIC EXAMPLE

Now, a third specific example in which the amplitude bandwidth limiting means of the first specific example and the phase bandwidth limiting means of the second specific example are used will be described.

Figure 4A:
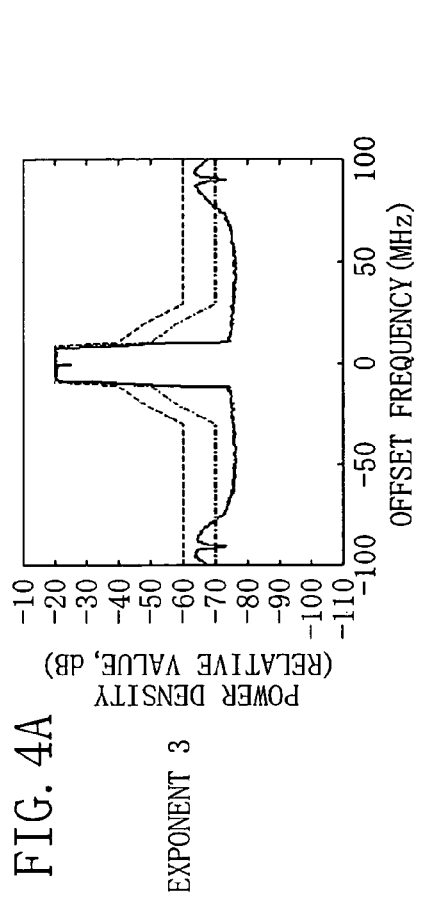
FIGS. 4A through 4C are graphs showing simulation results of a modulated signal in respective cases where only the exponential filter of the first specific example is used, where only the exponential filter of the second specific example is used, and where the exponential filters of the first and second specific examples are used.
Figure 4C:
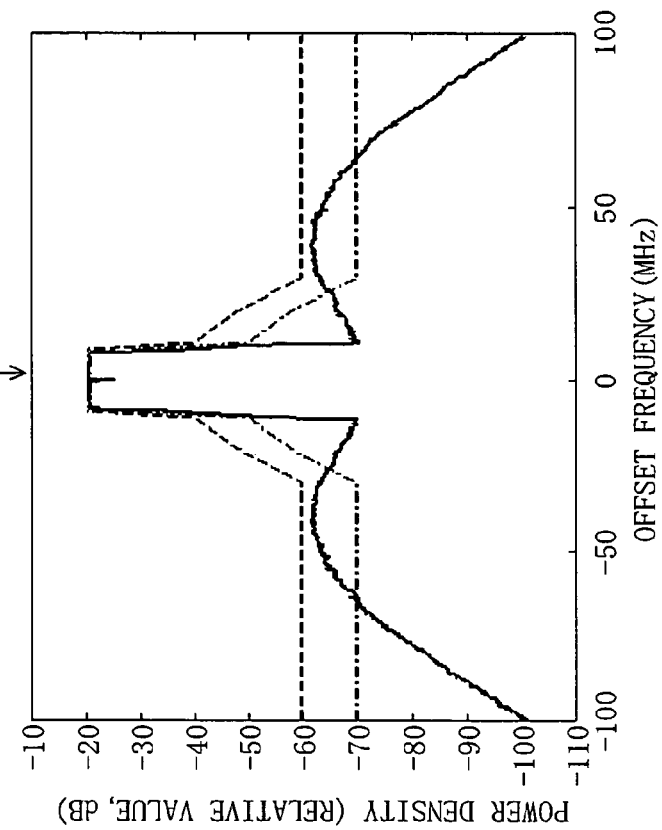
Figure 4B:
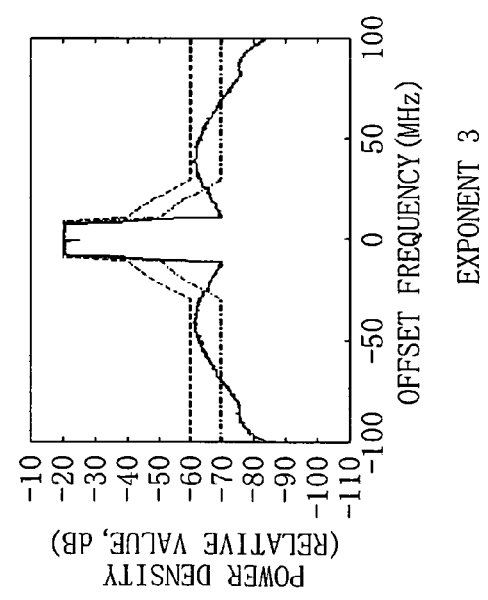

FIGS. 4A through 4C are graphs showing simulation results of a modulated signal in the respective cases where only the exponential filter of the first specific example is used, where only the exponential filter of the second specific example is used, and where the exponential filters of the first and second specific examples are used. FIG. 4A shows the same characteristic as that shown in FIG. 2D. FIG. 4B shows the same characteristic as that shown in FIG. 3C.

In FIG. 4C, the power density is attenuated noticeably in ranges where the offset frequency is large and thus the bandwidth limiting function is enhanced in these ranges as compared to the first and second examples.

The cutoff frequency (70 MHz) of the amplitude rectangular-window LPF 11, i.e., the cutoff frequency that the amplitude voltage generating means should have, differs from the cutoff frequency (80 MHz) of the phase rectangular-window LPF 13, i.e., the cutoff frequency that the phase modulated signal generating means should have. More specifically, the cutoff frequency of the amplitude rectangular-window LPF 11 is smaller than that of the phase rectangular-window LPF 13. In this manner, for an OFDM modulation, the frequency characteristic that a circuit for processing an amplitude modulated voltage and the frequency characteristic that a circuit for processing a phase modulated signal are preferably different from each other rather than being the same. Then, the scale of the whole transmission circuit is advantageously reduced.

FOURTH SPECIFIC EXAMPLE

Now, a fourth specific example in which a filter in a special case where exponent n or m in the first, second or third specific example is two, i.e., a so-called Gaussian filter, is used for each of the amplitude bandwidth limiting means and the phase bandwidth limiting means will be described. It should be noted that the amplitude roll-off LPF satisfies $$13/\{(16.6fc/fop)-24\}+0.9 \leq n \leq \{(16.6fc/fop)-20.5\}^2/35+1.3$$

and the phase roll-off LPF satisfies $$0 \leq m \leq 3.5 \exp[0.0615\{(16.6fc/fop)-30\}]$$

Figure 5A:
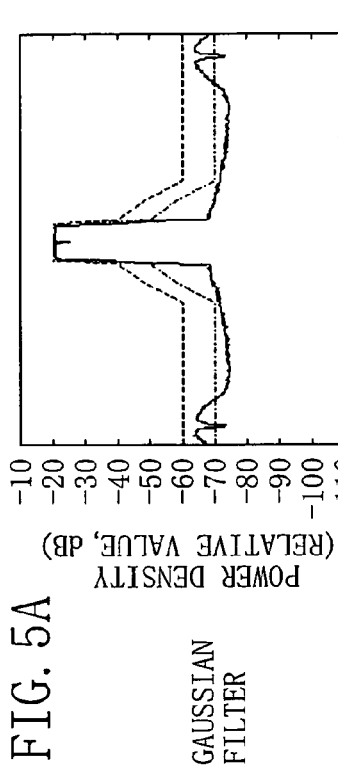
FIGS. 5A through 5C are graphs showing simulation results of a modulated signal in respective cases where only a Gaussian filter is used in the first specific example, where only a Gaussian filter is used in the second specific example, and where a Gaussian filter is used in a third specific example of the first embodiment.
Figure 5C:
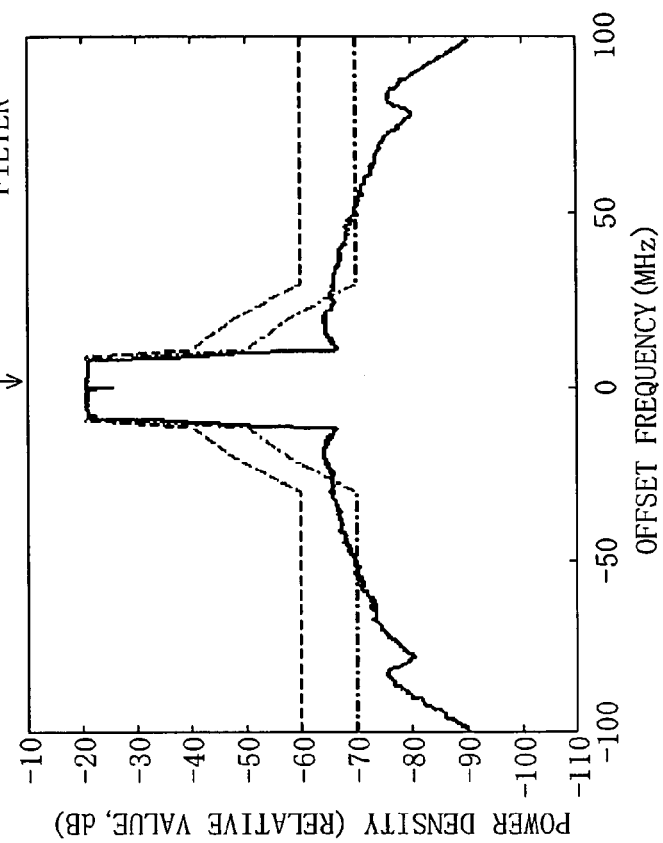
Figure 5B:
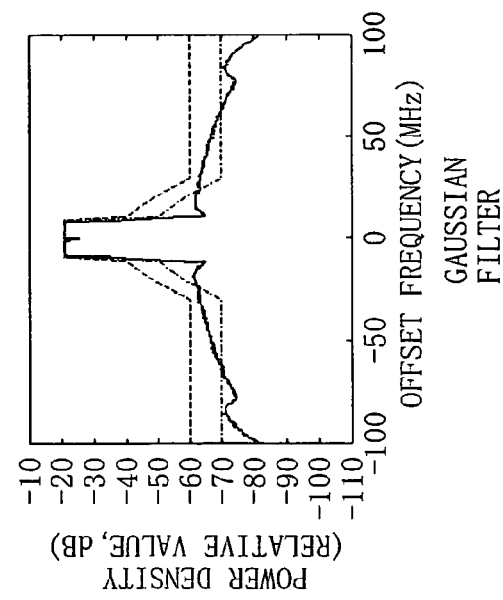

FIGS. 5A through 5C are graphs showing simulation results of a modulated signal in the respective cases where only a Gaussian filter is used in the first specific example, where only a Gaussian filter is used in the second specific example, and where a Gaussian filter is used in third specific example.

Suppose the characteristics of the amplitude roll-off LPF and the phase roll-off LPF are within respective appropriate areas, if n (or m) is two as shown in FIGS. 5A and 5B, an excellent spectrum is obtained using the Gaussian filter. In particular, if a Gaussian filter is used for each of the amplitude roll-off LPF and the phase roll-off LPF, not only the attenuation amount in ranges where the offset frequency is large but also unnecessary power density around the center frequency is reduced.

FIG. 6 is a graph showing impulse response characteristics of a roll-off filter in cases where the exponent is one, two and three, respectively. In FIG. 6, the abscissa represents time and the ordinate represents the response amplitude (relative value). As shown in FIG. 6, in the case of the Gaussian filter, the impulse response converges in a short period, so that the Gaussian filter has the advantage that filtering especially with digital signal processing is easy.

Now, a configuration of the Gaussian filter will be described. A Gaussian filter is a linear phase filter, which is approximated as an FIR filter when constituted by a digital filter and is approximate as a 5th order Bessel filter when constituted by an analog filter.

Figure 7B:
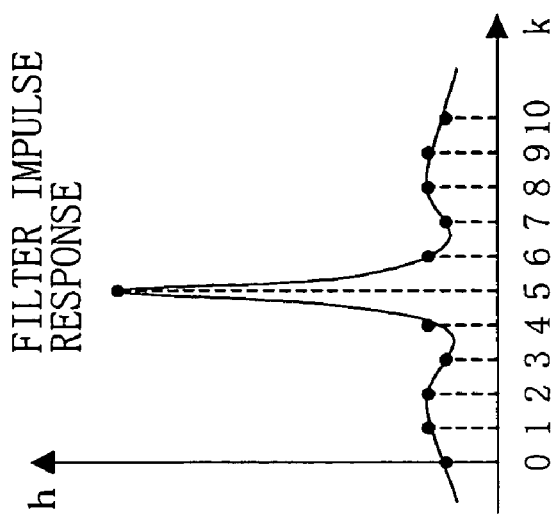
FIG. 7A is a block circuit diagram showing a Gaussian filter constituted by a digital filter and FIG. 7B is a graph showing the impulse response of the filter shown in FIG. 7A.
Figure 7A:
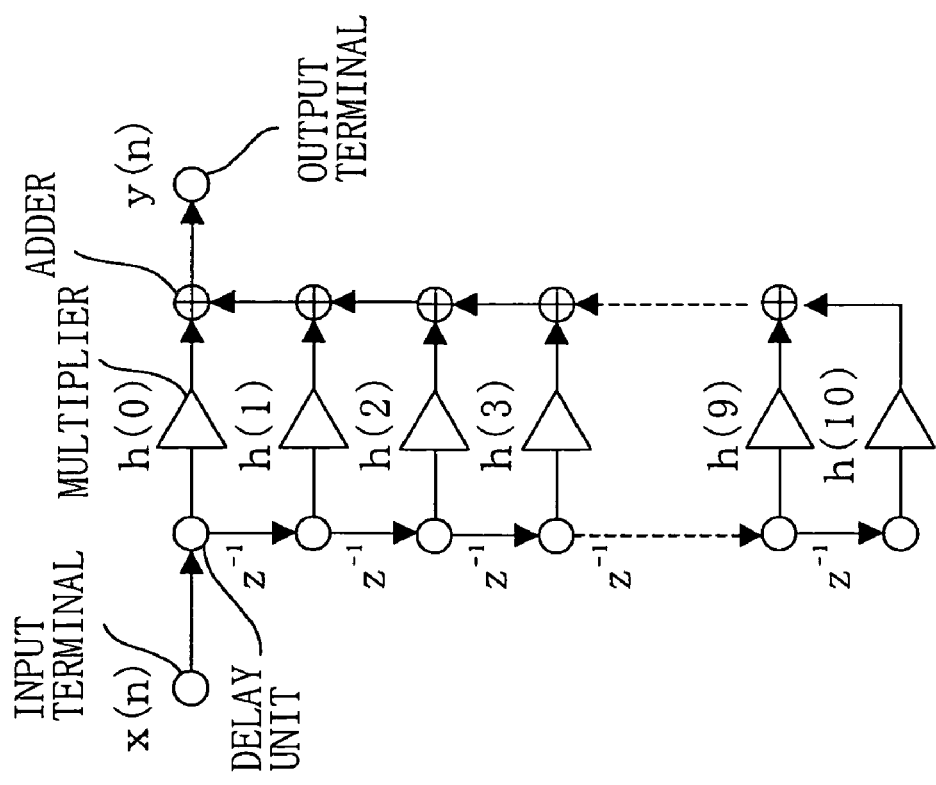

FIGS. 7A and 7B are a block circuit diagram and a graph, respectively, showing a Gaussian filter constituted by a digital filter. An FIR filter is configured by three basic components, i.e., a delay unit per unit time, a multiplier and an adder, as shown in FIG. 7A. The multiplier factor of the multiplier is a sampling value for the impulse response of the Gaussian filter. The number of this sampling is also called a tap number of a filter. As the tap number decreases, the scale of the digital circuit decreases. As described above, the Gaussian filter exhibits a rapid convergence of the impulse response so that the response is expressed by a small tap number. Accordingly, the scale of the digital circuit is reduced, which is effective for reducing costs and power consumption.

Figure 8A:
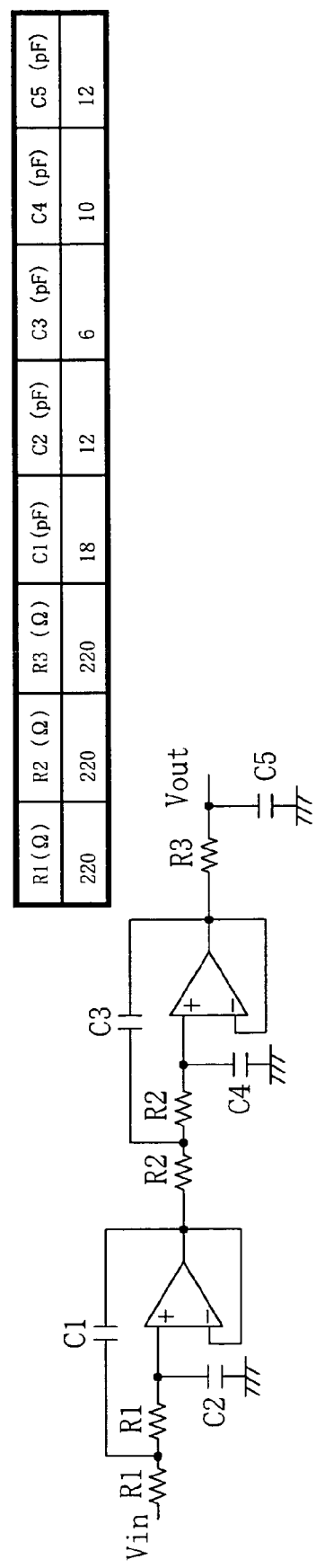
FIGS. 8A through 8C are block circuit diagrams showing respective Gaussian filters constituted by analog filters.
Figure 8B:
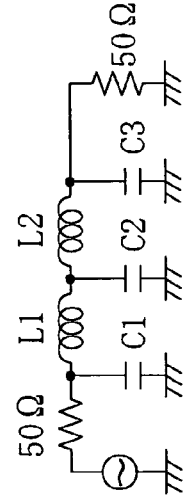
Figure 8C:
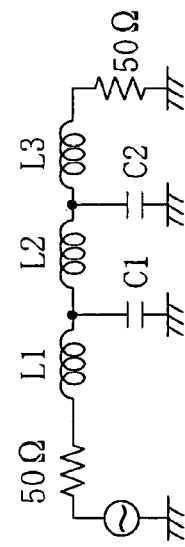

FIGS. 8A through 8C are block circuit diagrams showing respective Gaussian filters constituted by analog filters. FIG. 8A shows an exemplary design of a 5th order Bessel filter having an active filter configuration. FIGS. 8B and 8C show two exemplary designs of a Gaussian filter having an LC filter configuration. In each of the exemplary designs, the 3 dB-attenuation frequency (cutoff frequency) is 40 MHz.

It is known that if a Gaussian filter is constituted by an analog filter, a 5th Bessel filter provides the closest approximation. On the other hand, a Gaussian filter constituted by an LC filter is advantageous in terms of reduction in power consumption.

An exponential filter having exponent n or m other than two can also adopt a digital filter or an analog filter as the Gaussian filter as long as the impulse response waveform thereof is known. If a digital filter is adopted, the exponential filter is constituted by a FIR filter. If an analog filter is adopted, the exponent is approximated by adjusting the number of stages (order) of the Bessel filter for the exponential filter.

Embodiment 2

Figure 9:
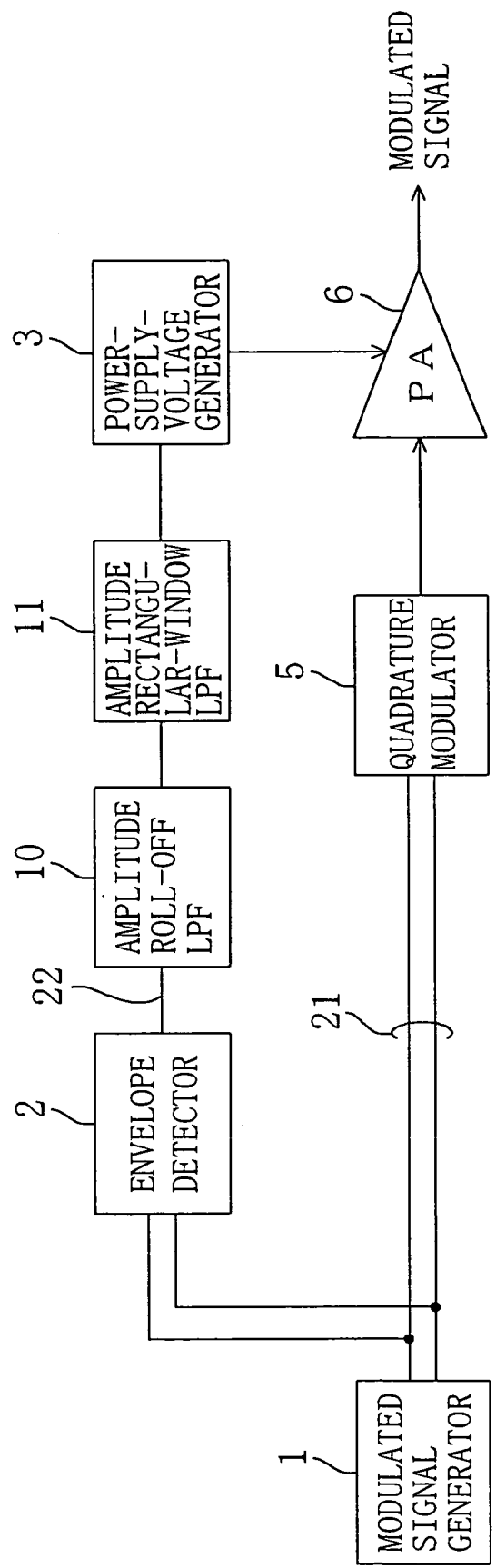
FIG. 9 is a block circuit diagram showing a transmission circuit according to a second embodiment of the present invention.

FIG. 9 is a block circuit diagram showing a transmission circuit according to a second embodiment of the present invention. As shown in FIG. 9, the transmission circuit of this embodiment includes: a modulated signal generator 1 for outputting a modulated signal; modulated signal lines 21 each divided into two branches and used for transmitting a modulated signal; an envelope detector 2 connected to the branches at one side of the respective modulated signal lines 21, receiving the modulated signal to detect the envelope of the signal and outputting an amplitude modulated voltage (an amplitude component); an amplitude modulated voltage line 22 extending from the envelope detector 2; an amplitude roll-off low-pass filter (LPF) 10 interposed in the amplitude modulated voltage line 22, receiving the amplitude modulated voltage output from the envelope detector 2 and performing bandwidth limitation on the received voltage; an amplitude rectangular-window LPF 11 interposed in the amplitude modulated voltage line 22, receiving the amplitude modulated voltage which has passed through the amplitude roll-off LPF 10 and performing bandwidth limitation on the received voltage; a power-supply-voltage generator 3 (a DC-to-DC converter) interposed in the amplitude modulated voltage line 22, receiving the amplitude modulated voltage which has passed through the amplitude rectangular-window LPF 11 and generating a power supply voltage in accordance with an amplitude value; a quadrature modulator 5 interposed in the branches at the other side of the respective modulated signal lines 21, receiving the modulated signal and performing a quadrature modulation on the received signal; and an RF power amplifier 6 receiving the output from the power-supply-voltage generator 3 at its power-supply-voltage terminal and receiving the output from the quadrature modulator 5 at its RF input terminal. In this embodiment, the amplitude of the modulated signal is limited at the input of the RF power amplifier 6.

In this embodiment, the rectangular-window LPF 11 is not necessarily provided. If the analog circuits at respective portions have appropriate frequency cutoff characteristics, this filter is unnecessary.

Now, it will be described how the transmission circuit shown in FIG. 9 operates.

The modulated signal generator 1, the envelope detector 2, the roll-off LPF 10, the rectangular-window LPF 11 and the power-supply-voltage generator 3 operate in the manners described in the first embodiment.

In this embodiment, the quadrature modulator 5 generates a modulated signal by performing a quadrature modulation on a modulated signal represented by a complex envelope to convert the signal into an RF signal.

The PA 6 as the RF power amplifier exhibits class-A operation. The RF signal output from the quadrature modulator 5 is input to the RF input terminal of the PA 6 and an amplitude modulated voltage is input to the power-supply-voltage terminal of the PA 6 through the modulated signal line 21. In this embodiment, the amplitude of the modulated signal is limited at the input of the RF power amplifier 6 to be a modulated signal having a constant envelope inside the RF power amplifier 6. The RF power amplifier 6 amplifies the modulated signal having the constant envelope after the amplification limitation to obtain an RF signal having an amplitude according to an amplitude modulated voltage subjected to low-pass filtering, thereby outputting a modulated signal whose amplitude and phase are variable.

Each of the amplitude roll-off LPF 10, the amplitude rectangular-window LPF 11 and the power-supply-voltage generator 3 performs linear operation, so that the order of arrangement of these components with respect to the flow of the signal may differ from that described in this embodiment.

Unlike the first embodiment, EER is performed using not a phase modulated signal with a constant envelope but a signal subjected to a quadrature modulation involving an amplitude modulation in this embodiment. It will be described that an EER technique is performed with the configuration of the transmission circuit of this embodiment with reference to the drawings.

FIGS. 10A through 10D are diagrams for describing circuit operation in which a pseudo-EER technique is performed using a constant envelope region.

Figure 10A:
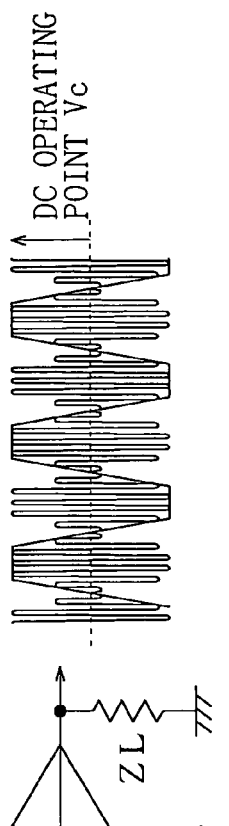
FIGS. 10A through 10D are diagrams for describing circuit operation in which a pseudo-EER technique is performed using a constant envelope region.
Figure 10B:
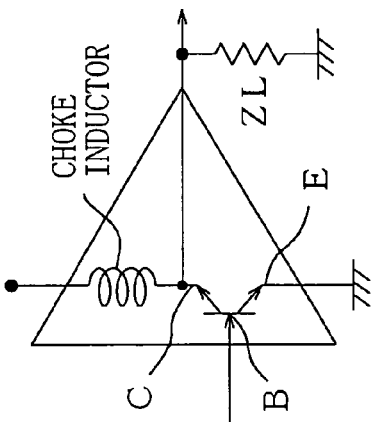

The modulated wave (OFDM modulated wave in this embodiment) input to the RF power amplifier 6 is herein a triangular wave in which the envelope of the amplitude is triangular as shown in FIG. 10A for simplicity. FIG. 10B shows an internal structure of the RF power amplifier 6. The RF power amplifier 6 of this embodiment is a common emitter bipolar transistor. The OFDM modulated wave which is the modulated signal in this embodiment is input to the base (RF input terminal) of the bipolar transistor. This RF power amplifier is expressed by a simplified circuit in which a choke inductor is inserted between the collector (power-supply-voltage terminal) of the bipolar transistor and a terminal at which a collector voltage Vc is supplied and a line connecting the collector to the RF output terminal is grounded via an output load ZL.

Figure 10C:
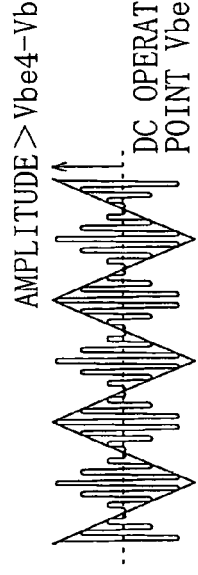
Figure 10D:
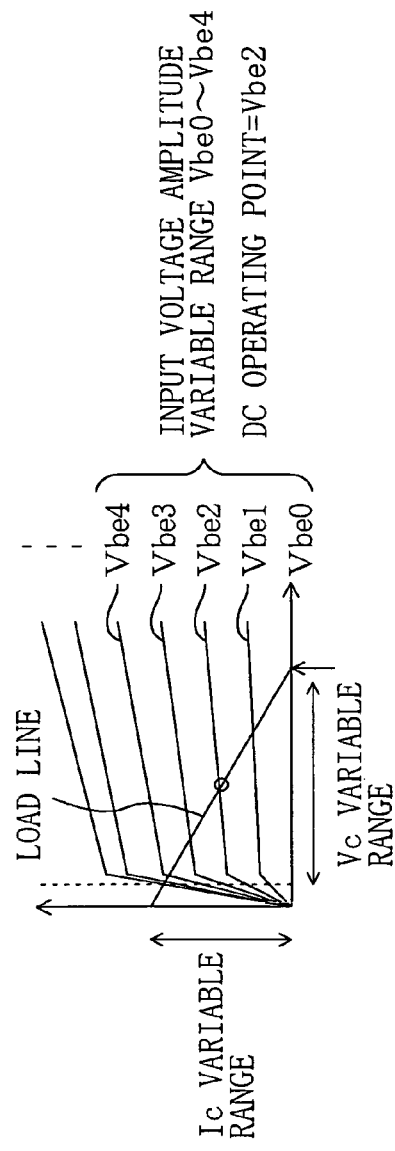

FIG. 10D is a graph for explaining an input-output characteristic of the RF power amplifier 6. The ordinate represents a collector current Ic of the RF power amplifier 6 and the abscissa represents the collector voltage Vc applied to the power-supply-voltage terminal of the RF power amplifier 6. FIG. 10D shows that the Ic-Vc characteristic changes with respect to the base-emitter voltage Vbe of the RF power amplifier and that a load line, which is determined by the DC base-emitter voltage Vbe, the DC current collector voltage Vc and the output load ZL of the RF power amplifier, determines the variable range of the base-emitter voltage Vbe and also determines the variable ranges of the collector current Ic and the collector voltage Vc.

FIG. 10C shows the resultant output voltage from the RF output terminal of the RF power amplifier. The output power is determined by this output voltage and the output impedance ZL.

In this embodiment, the amplitude of the modulated signal input to the RF power amplifier 6 is sufficiently large and the input impedance of the RF power amplifier 6 provides a voltage amplitude exceeding the input voltage amplitude variable range (variable range of Vbe) determined by a load connected to the RF power amplifier 6. When the input voltage exceeds the variable range (Vbe4–Vbe2 in FIG. 10D) of the base-emitter voltage Vbe, the corrector current exceeds the variable range of the collector current Ic determined by the load line, thus creating a (constant envelope) time region in which the current amplitude is constant. Accordingly, the corrector current determined by the transconductance of the RF power amplifier 6 is constant in this time region. Since the output voltage is generated by the flow of the collector current in the load, the output voltage of the RF power amplifier 6 has a constant (constant envelope) amplitude while the amplitude of the input modulated signal exceeds the amplitude variable range of the input voltage. Though the modulated signal whose envelope is constant has a wider frequency band, the bandpass region of the RF power amplifier 6 is generally wider than this wider frequency band so that no partial decrease of the amplitude caused by filtering of high frequencies occurs. With the configuration of the transmission circuit of this embodiment, a quadrature modulated signal with an amplitude is output in a time region where the envelope of the amplitude is not constant. Accordingly, if the phase is multiplied by the amplitude at the collector terminal, the amplitude is raised to the second power. Therefore, it is sufficient to take the square roots of the amplitude only in this time region beforehand in the modulated signal generator. In the time region, no modulation is performed by an EER technique. In this manner, a constant envelope signal is obtained from the quadrature modulated signal with the amplitude and EER is appropriately performed in this time region.

Now, effects obtained by performing an EER technique on the quadrature modulated signal with the amplitude will be described.

In general, if a modulated signal is converted to a phase modulated signal and then subjected to low-pass filtering, this phase modulated signal loses its high-frequency components and the amplitude thereof does not exhibits the constant envelope any more. If the phase modulated signal whose amplitude is partially lost on the time axis as described above is input to the RF power amplifier 6, the amplitude of the signal is limited at the input of the RF power amplifier 6, so that the level of the lost part of the amplitude is raised. At this time, phase information of the original modulated signal is not stored. Therefore, the resultant signal is multiplied by the amplitude modulated signal at the output of the RF power amplifier 6, resulting in deterioration in modulation accuracy and spectrum of the output modulated signal.

On the other hand, in the configuration of the transmission circuit of this embodiment, not a phase modulated signal but a modulated signal obtained by performing a quadrature modulation on a modulated signal is used, so that it is unnecessary to provide a phase roll-off LPF for bandwidth limitation and thus the configuration is simplified. Specifically, a roll-off LPF is constituted by a digital filter or an analog filter using an operation amplifier as described in the first embodiment, but these filters are not needed in the second embodiment. Therefore, the second embodiment is more advantageous than the first embodiment in terms of power consumption and costs. In addition, in the second embodiment, the power density around the center frequency is reduced as compared to the first embodiment, so that a wider margin based on the standard is allowed.

The modulated signal generator 1 of this embodiment may include predistortion techniques to perform operation on the original modulated signal with the inverse function of a distortion characteristic of the RF power amplifier 6. Then, the distortion characteristic of the RF power amplifier 6 is compensated, thus obtaining a modulated signal with higher accuracy.

In general, in a case where a phase modulated signal with a constant envelope is input to an RF power amplifier, even if the amplitude modulated signal is zero, an amplitude which causes an error at the output of the RF power amplifier appears due to a leakage of input power to the output. This leakage is determined by an isolation characteristic between the RF input and RF output of the RF power amplifier.

On the other hand, in this embodiment, when the amplitude modulated voltage applied to the power-supply-voltage terminal of the RF power amplifier 6 is zero, power input to the RF power amplifier 6 is also zero, so that a correctly-modulated signal is generated at the output of the RF power amplifier 6 independently of the isolation characteristic.

Next, exemplary characteristics of a roll-off LPF and a roll-off bandpass filter and examples of spectrum of the output modulated signal in the transmission circuit of this embodiment will be described. An OFDM modulation based on IEEE 802.11a standard is adopted as an example. For reference, the occupied bandwidth (fop) of the modulated signal generated by the modulated signal generator 1 is 16.6 MHz.

FIRST SPECIFIC EXAMPLE

As the amplitude roll-off LPF 10 serving as the amplitude bandwidth limiting means, an exponential filter having the following function is used in this specific example. The exponential filter has a filtering characteristic that the amplitude ratio of a voltage after passage to an input voltage is proportional to the value obtained by the following expression:

$$\exp\{-(\ln 2)/2(f/fc)^n\}$$

where $13/\{(16.6fc/fop)-24\}+0.9 \leq n \leq \{(16.6fc/fop)-20.5\}^2/35+1.3$, f is the frequency (MHz), fc is the 3 dB-attenuation frequency (MHz), and fop is the occupied bandwidth (MHz) of a modulated signal.

FIGS. 11A through 11D are graphs for showing an appropriate area of exponent n of the exponential filter according to the first specific example and simulation results of the modulated signal spectrum (relative value of the power density) with respect to respective values of exponent n.

FIG. 11A shows the appropriate area of exponent n (ordinate) of the exponential filter with respect to 3 dB-attenuation frequency fc (abscissa). The appropriate area of exponent n is represented as the hatched area in FIG. 11A. Specifically, the lower limit of the appropriate area of exponent n is defined by the curve $n=13/\{(16.6fc/fop)-24\}+0.9$, and the upper limit thereof is defined by the curve $n=\{(16.6fc/fop)-20.5\}^2/35+1.3$. It should be noted that in FIG. 11A, the occupied bandwidth fop of the modulated signal is 16.6 MHz, the cutoff frequency of the amplitude rectangular-window LPF is 70 MHz and the bandwidth limitation of the phase modulated signal is 90 MHz as in the conventional example.

FIGS. 11B through 11D show respective simulation results of the modulated signal spectrum. The abscissa represents the offset frequency with respect to the center frequency and the ordinate represents the power density. In FIGS. 11B through 11D, the solid lines indicate a power density of the modulated signal, the broken lines indicate the upper limit of a power density defined based on IEEE 802.11a standard, and the dash-dotted lines indicate a power density with a margin of 10 dB from the upper limit of the power density defined based on IEEE 802.11a standard. In the examples shown in FIGS. 11B through 11D, 3 dB-attenuation frequency fc is 40 MHz.

As shown in FIG. 11B, if exponent n deviates from the appropriate area toward larger values (e.g., n=13), the power density rises around the difference frequencies (±70 MHz) with respect to the cutoff frequency of the amplitude rectangular-window filter so that the margin of 10 dB disappears. If exponent n deviates from the appropriate area toward smaller values (e.g., n=1) as shown in FIG. 11C, the margin of 10 dB disappears around the center frequency. If exponent n is within the appropriate area (e.g., n=3) as shown in FIG. 11D, the power density has the margin of 10 dB around the center frequency as intended.

SECOND SPECIFIC EXAMPLE

Now, a second specific example in which a special filter in which exponent n in the first specific example is two, i.e., a so-called Gaussian filter, is used for the amplitude bandwidth limiting means will be described. It should be noted that exponent n of the amplitude roll-off LPF is within an appropriate area that satisfies $$13/\{(16.6fc/fop)-24\}+0.9 \leq n \leq \{(16.6fc/fop)-20.5\}^2/35+1.3$$

Figure 12:
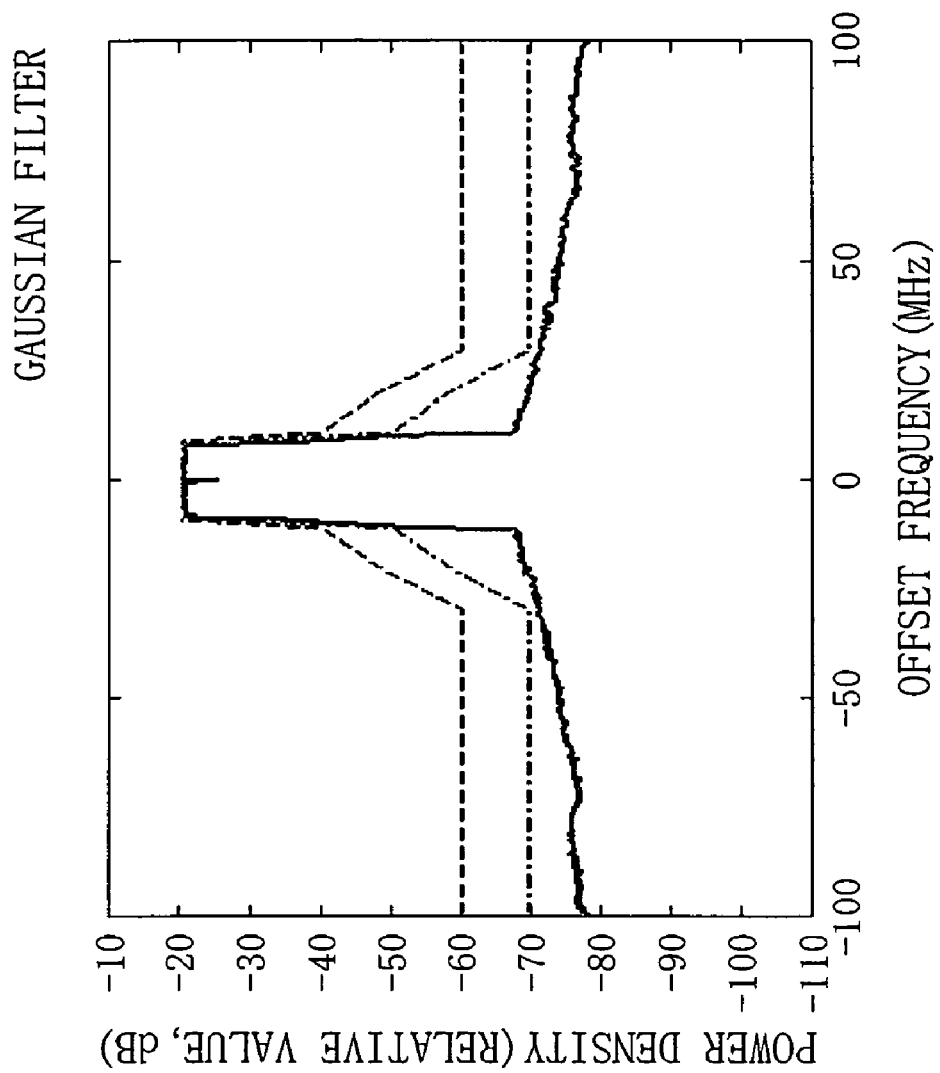
FIG. 12 is a graph showing a simulation result of a modulated signal when a Gaussian filter is used in a second specific example of the second embodiment.
Figure 13:
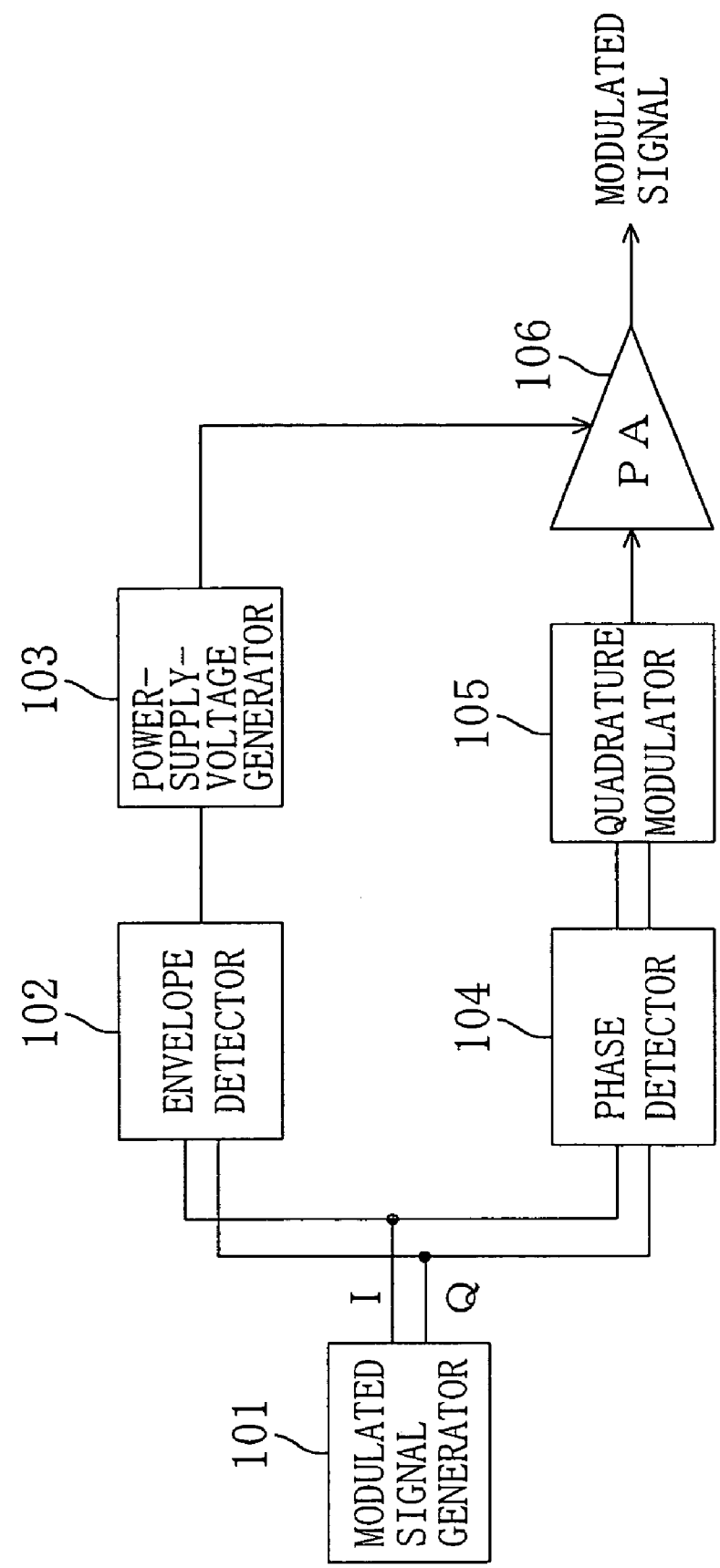
FIG. 13 is a block circuit diagram schematically showing a conventional transmission circuit using an EER technique.

FIG. 12 is a graph showing a simulation result of a modulated signal when a Gaussian filter is used in the second specific example.

Suppose the characteristic of the amplitude roll-off LPF is within appropriate area, if exponent n is two as shown in FIG. 12, an excellent spectrum is obtained using the Gaussian filter. In the case of the Gaussian filter, as in the first embodiment, the impulse response converges within a short period so that the Gaussian filter has the advantage that filtering particularly with digital signal processing is easy (see FIG. 6).

As in the first embodiment, the Gaussian filter is a linear phase filter, which is approximated as an FIR filter when constituted by a digital filter and is approximate as a 5th order Bessel filter when constituted by an analog filter. The specific configuration of the Gaussian filter is already described in the first embodiment with reference to FIGS. 7A and 7B and FIGS. 8A through 8C.

Now, a device for implementing the transmission circuits of the first and second embodiments will be described.

In the first embodiment, the modulated signal generator 1, the envelope detector 2, the amplitude roll-off LPF 10 and the phase detector 4 may be mounted on one LSI chip, or the modulated signal generator 1, the envelope detector 2, the phase detector 4 and the phase roll-off LPF 12 may be mounted on one LSI chip. Alternatively, the modulated signal generator 1, the envelope detector 2, the amplitude roll-off LPF 10, the phase detector 4 and the phase roll-off LPF 13 may be mounted on one LSI chip. In the first embodiment, one of or both of the amplitude rectangular-window LPF 11 and the phase rectangular-window LPF 13 may be mounted on the LSI chip. In either case, other circuit elements, i.e., the power-supply-voltage generator 3 (DC-to-DC converter) and the RF power amplifier 6 are provided on another LSI chip or on respective discrete chips.

In the second embodiment, the modulated signal generator 1, the envelope detector 2 and the amplitude roll-off LPF 10 may be mounted on one LSI chip. Alternatively, the amplitude rectangular-window LPF 11 may be further mounted on the LSI chip. In either case, other circuit elements, i.e., the power-supply-voltage generator 3 (DC-to-DC converter) and the RF power amplifier 6 are provided on another LSI chip or on respective discrete chips.

The frequency converting means (quadrature modulator 5) is not necessarily provided. However, if the quadrature modulator 5 is provided, it is possible to process an RF signal covering a wider band. For example, since the DA converter handles signals with frequencies in the band of several hundreds MHz at most, the DA converter cannot process carriers whose frequencies exceed GHz. However, if the frequency converting means is used, the carrier frequency is up-converted easily.

In the first embodiment, the frequency converting means such as the quadrature modulator is preferably provided on an LSI chip on which the modulated signal generator 1, the envelope detector 2, the amplitude roll-off LPF 10 and the phase detector 4 are mounted or an LSI chip on which the signal generator 1, the envelope detector 2, the phase detector 4, the phase roll-off LPF 12 and other components are mounted. In the second embodiment, the frequency converting means such as the quadrature modulator is preferably provided on an LSI chip on which the modulated signal generator 1, the envelope detector 2, the amplitude roll-off LPF 10 and other components are mounted.

One of or both of the power-supply-voltage generator 3 (DC-to-DC converter) and the RF power amplifier 6 may be provided on respective discrete chips to constitute the transmission circuit. In the first embodiment, one of or both of the power-supply-voltage generator 3 and the RF power amplifier 6 may be provided on a chip on which the modulated signal generator 1, the envelope detector 2, the amplitude roll-off LPF 10, the phase detector 4 and other components are mounted, a chip on which the modulated signal generator 1, the envelope detector 2, the phase detector 4, the phase roll-off LPF 12 and other components are mounted, or a chip on which the modulated signal generator 1, the envelope detector 2, the amplitude roll-off LPF 10, the phase detector 4, the phase roll-off LPF 13 and other components are mounted, to form system LSI. In the second embodiment, one of or both of the power-supply-voltage generator 3 and the RF power amplifier 6 may be provided on a chip on which the modulated signal generator 1, the envelope detector 2, the amplitude roll-off LPF 10 and other components are mounted, to form system LSI.

The transmission circuit according to the present invention is applicable as a transmission section of wireless communication apparatus such as cellular phones and wireless LANs.

What is claimed is:

1. A transmission circuit comprising:
    modulated signal generating means for generating a modulated signal including a phase and an amplitude;
    a modulated signal line for transmitting the modulated signal, the modulated signal line being connected to the modulated signal generating means;
    amplitude modulated voltage generating means for generating an amplitude modulated voltage in accordance with the amplitude of the modulated signal generated by the modulated signal generating means, the amplitude modulated voltage generating means being connected to the modulated signal line;
    an amplitude modulated voltage line for transmitting the amplitude modulated voltage, the amplitude modulated voltage line being connected to the amplitude modulated voltage generating means; and
    amplitude bandwidth limiting means for attenuating the amplitude modulated voltage output from the amplitude modulated voltage generating means by using a damping property represented by an exponential function in which an argument is exponentially proportional to a frequency, the amplitude bandwidth limiting means being interposed in the amplitude modulated voltage line.

2. The transmission circuit of claim 1, wherein in the amplitude bandwidth limiting means, the amplitude ratio of a voltage after passage to an input voltage is proportional to the value obtained by the following expression:

$$\exp\{-(1n2)/2(f/fc)^n\}$$

where $13/\{(16.6fc/fop)-24\}+0.9 \leq n \leq \{(16.6fc/fop)-20.5\}^2/35+1.3$, f is the frequency (MHz), fc is the 3 dB-attenuation frequency (MHz), and fop is the occupied bandwidth (MHz) of the modulated signal.

3. The transmission circuit of claim 2, wherein n is two in the expression.

4. The transmission circuit of claim 1, further comprising power-supply-voltage generating means for generating a power supply voltage by DC conversion of the amplitude modulated voltage which has passed through the amplitude bandwidth limiting means, the power-supply-voltage generating means being interposed in the amplitude modulated voltage line.

5. The transmission circuit of claim 4, further comprising an RF power amplifier including an RF input terminal connected to the modulated signal line and a power-supply-voltage terminal connected to the amplitude modulated voltage line.

6. The transmission circuit of claim 1, further comprising frequency converting means interposed in the modulated signal line at an earlier stage of the RF power amplifier.

7. The transmission circuit of claim 1, further comprising:
    phase modulated signal generating means for generating a phase modulated signal in accordance with the phase of the modulated signal generated by the modulated signal generating means, the phase modulated signal generating means being connected to the modulated signal line; and
    a phase modulated signal line for transmitting the phase modulated signal, the phase modulated signal line being connected to the phase modulated generating means.

8. The transmission circuit of claim 7, further comprising phase bandwidth limiting means for attenuating the voltage of the phase modulated signal output from the phase modulated signal generating means by using a damping property represented by an exponential function in which an argument is exponentially proportional to a frequency, the amplitude bandwidth limiting means being interposed in the phase modulated signal line.

9. The transmission circuit of claim 8, wherein in the phase bandwidth limiting means, the amplitude ratio of a voltage after passage to an input voltage is proportional to the value obtained by the following expression:

$$\exp\{-(1n2)/2(f'/f'c)^m\}$$

where $0 \leq m \leq 3.5 \exp[0.0615\{(16.6f'c/f'op)-30\}]$, f' is the offset frequency (MHz), f'c is the 3 dB-attenuation frequency (MHz), and f'oc is the occupied bandwidth (MHz) of the modulated signal.

10. The transmission circuit of claim 8, wherein a cutoff frequency of the amplitude bandwidth limiting means is lower than a cutoff frequency of the phase bandwidth limiting means.

11. The transmission circuit of claim 7, further comprising an RF power amplifier including an RF input terminal connected to the phase modulated signal line and a power-supply-voltage terminal connected to the amplitude modulated voltage line.

12. The transmission circuit of claim 7, further comprising frequency converting means interposed in the phase modulated signal line at an earlier stage of the RF power amplifier.

13. A transmission circuit comprising:
    modulated signal generating means for generating a modulated signal including a phase and an amplitude;
    a modulated signal line for transmitting the modulated signal, the modulated signal line being connected to the modulated signal generating means;
    amplitude modulated voltage generating means for generating an amplitude modulated voltage in accordance with the amplitude of the modulated signal generated by the modulated signal generating means, the amplitude modulated voltage generating means being connected to the modulated signal line;

an amplitude modulated voltage line for transmitting the amplitude modulated voltage, the amplitude modulated voltage line being connected to the amplitude modulated voltage generating means;

phase modulated signal generating means for generating a phase modulated signal in accordance with the phase of the modulated signal generated by the modulated signal generating means, the phase modulated signal generating means being connected to the modulated signal line;

a phase modulated signal line for transmitting the phase modulated signal, the phase modulated signal line being connected to the phase modulated signal generating means; and phase bandwidth limiting means for attenuating the voltage of the phase modulated signal output from the phase modulated signal generating means by using a damping property represented by an exponential function in which an argument is exponentially proportional to a frequency, the phase bandwidth limiting means being interposed in the phase modulated signal line.

14. The transmission circuit of claim 13, wherein in the phase bandwidth limiting means, the amplitude ratio of a voltage after passage to an input voltage is proportional to the value obtained by the following expression:

$$\exp\{-(ln2)/2(f'/f'c)^m\}$$

where $0 \leq m \leq 3.5$ $\exp[0.0615\{(16.6f'c/f'op)-30\}]$, f' is the offset frequency (MHz), f'c is the 3 dB-attenuation frequency (MHz), and f'oc is the occupied bandwidth (MHz) of the modulated signal.

15. The transmission circuit of claim 13, further comprising an RF power amplifier including an RF input terminal connected to the phase modulated signal line and a power-supply-voltage terminal connected to the amplitude modulated voltage line.

16. The transmission circuit of claim 13, further comprising frequency converting means interposed in the phase modulated signal line at an earlier stage of the RF power amplifier.

* * * * *